(12) United States Patent
Christensen

(10) Patent No.: US 11,415,865 B2
(45) Date of Patent: Aug. 16, 2022

(54) SEAMLESS HOIST

(71) Applicant: Bo Christensen, Nordberg (DK)

(72) Inventor: Bo Christensen, Nordberg (DK)

(73) Assignee: Sanage Universal, Chadler, AZ (US)

(*) Notice: Subject to any disclaimer, the term of this patent is extended or adjusted under 35 U.S.C. 154(b) by 144 days.

(21) Appl. No.: 16/873,967

(22) Filed: Aug. 31, 2020

(65) Prior Publication Data

US 2022/0066288 A1    Mar. 3, 2022

(51) Int. Cl.
*B65H 75/30* (2006.01)
*G03B 15/10* (2021.01)
*B65H 75/44* (2006.01)

(52) U.S. Cl.
CPC .......... *G03B 15/10* (2013.01); *B65H 75/30* (2013.01); *B65H 75/4494* (2013.01)

(58) Field of Classification Search
CPC ..... G03B 15/10; B65H 75/30; B65H 75/4494
See application file for complete search history.

(56) References Cited

U.S. PATENT DOCUMENTS

| | | | | |
|---|---|---|---|---|
| 3,128,688 A | * | 4/1964 | Coda | G03B 15/06 396/3 |
| 5,799,213 A | * | 8/1998 | Saar | G03B 15/06 396/3 |
| 5,979,093 A | * | 11/1999 | Harruff | G09F 11/29 40/518 |
| 9,655,800 B1 | * | 5/2017 | Ferderber | A61G 7/1059 |
| 11,053,731 B2 | * | 7/2021 | Lin | E06B 9/72 |
| 11,085,235 B2 | * | 8/2021 | McCreadie | E06B 9/50 |
| 2011/0299841 A1 | * | 12/2011 | Cheng | G03B 15/06 396/3 |

* cited by examiner

*Primary Examiner* — Sang K Kim
(74) *Attorney, Agent, or Firm* — Mark Ogram

(57) ABSTRACT

The invention provides a hoist mechanism for a backdrop as used in the photographic setting. The hoist uses two vertical channels, each having and upper and a lower pull around which a belt is attached. A bracket, secured to the belt, is used to secure a roller of the backdrop thereto. A connecting rod, secured to the lower pullies of the vertical channels, is used to keep the two belts operating in concert. A hand crank, secured to the connecting rod, permits the operator to move the two brackets up/down which moves the a roller having the backdrop in like fashion.

17 Claims, 8 Drawing Sheets

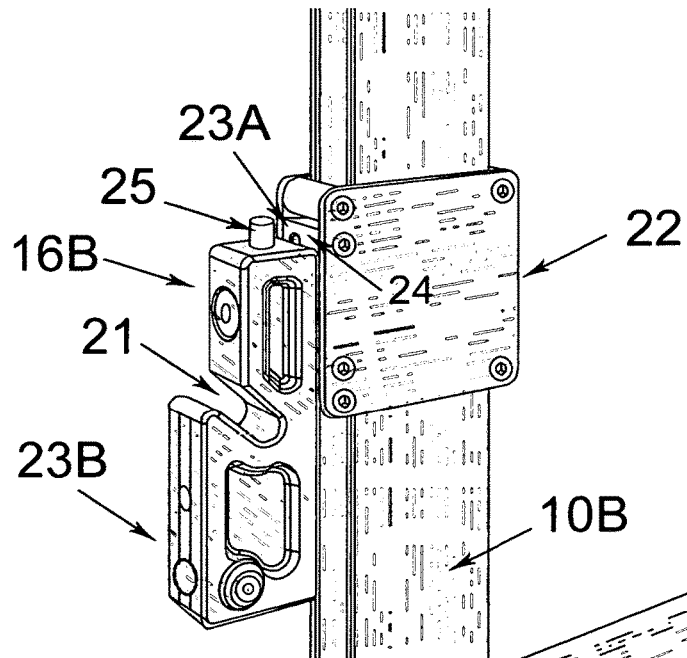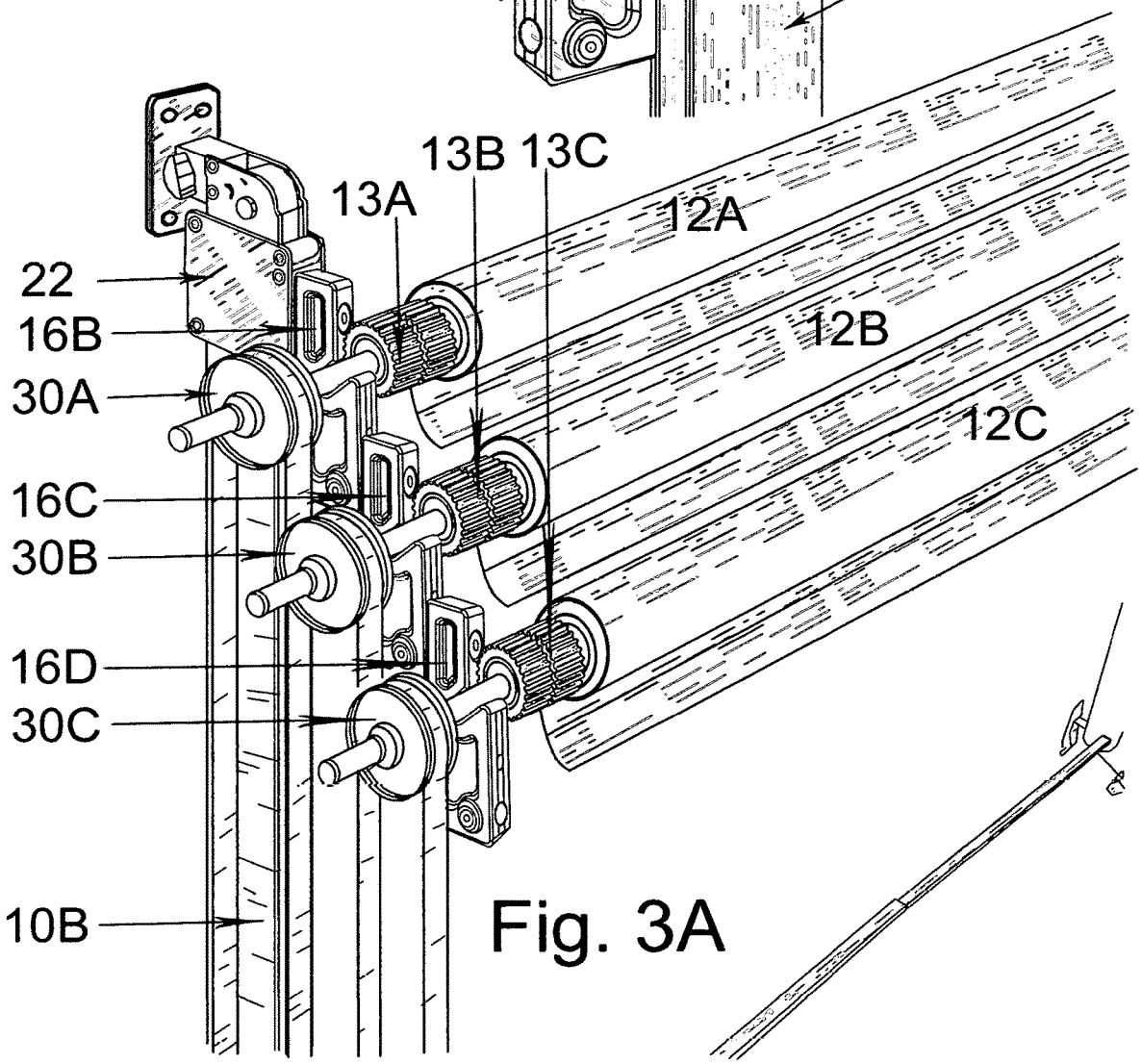

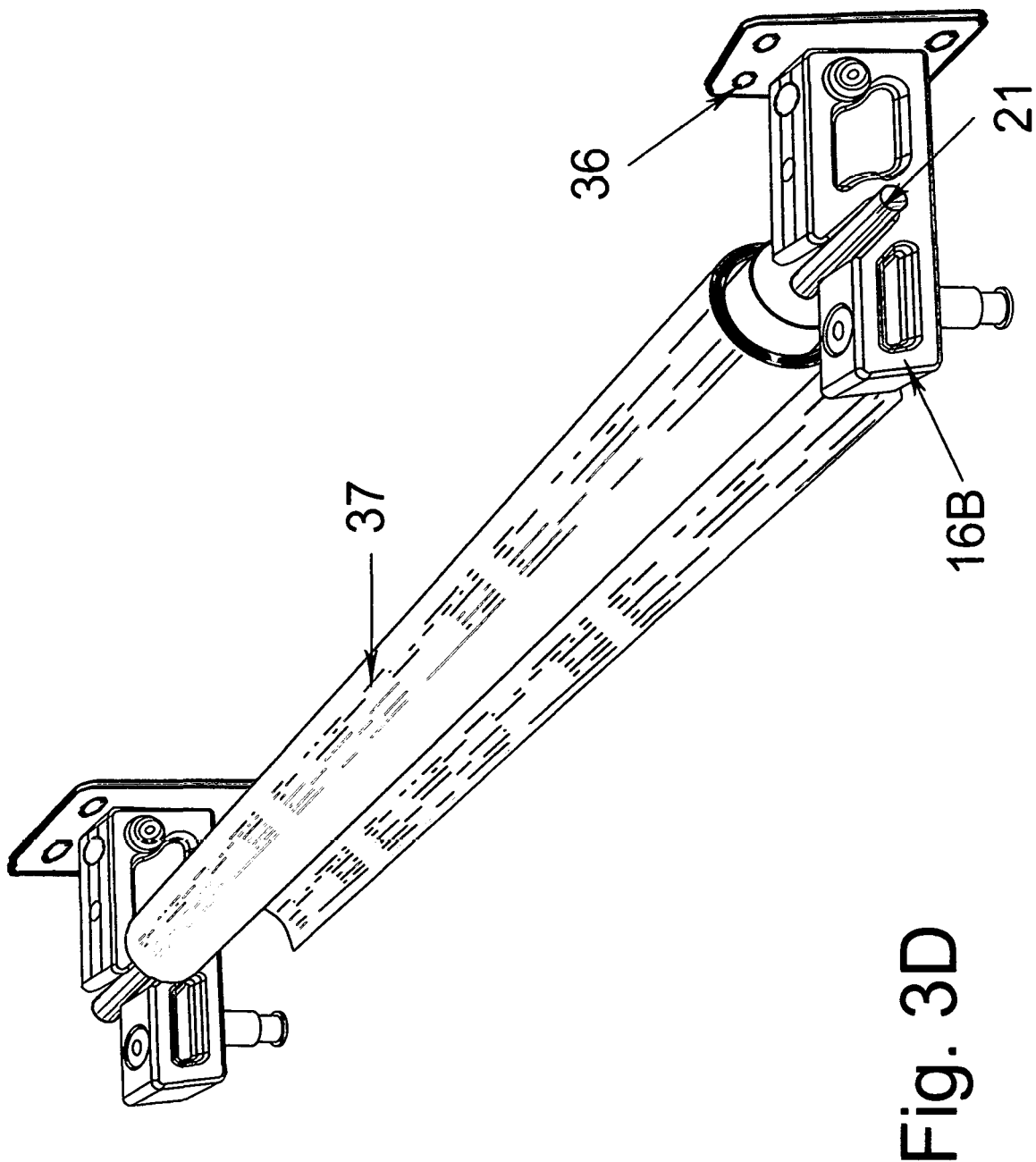

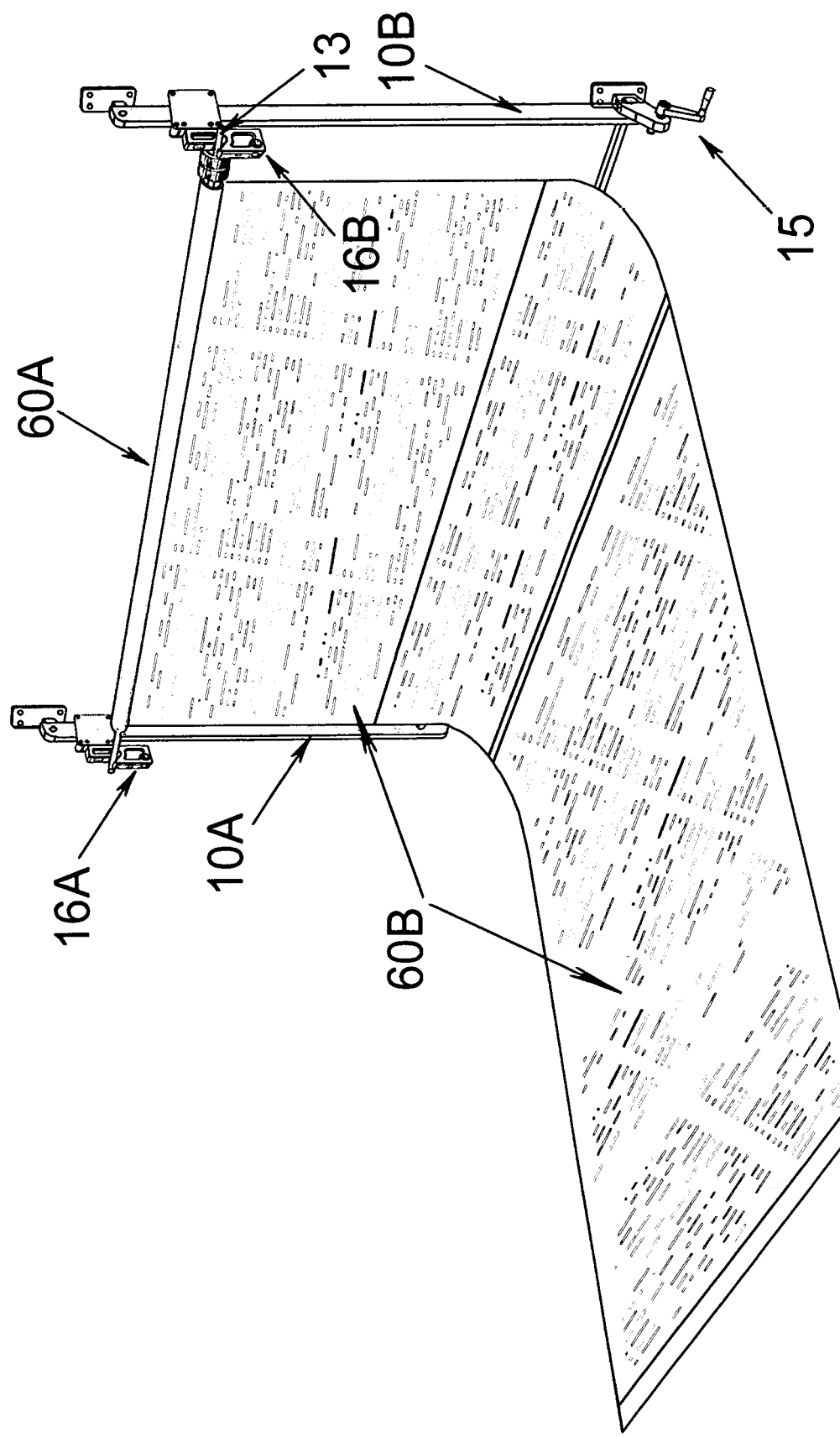

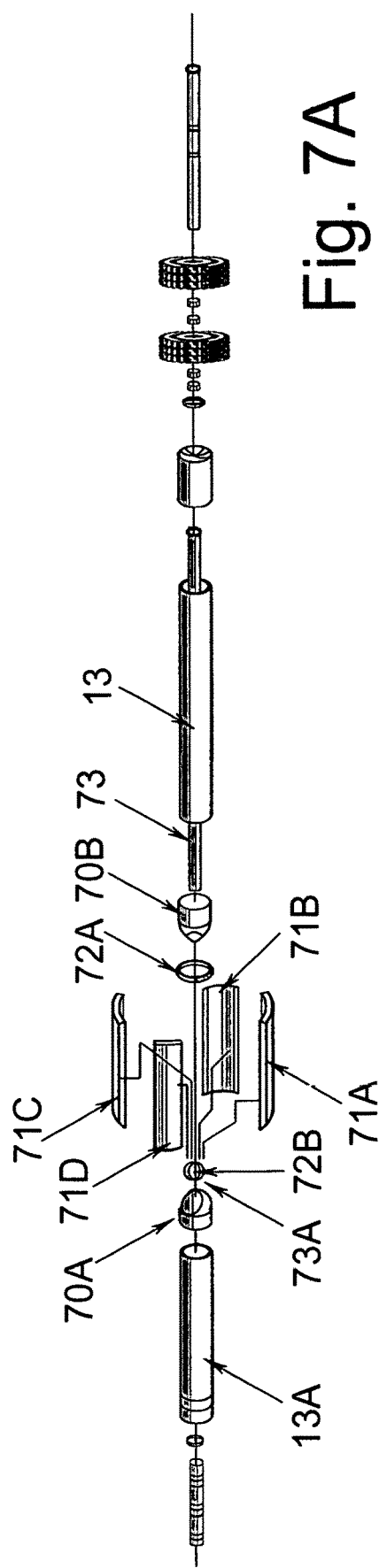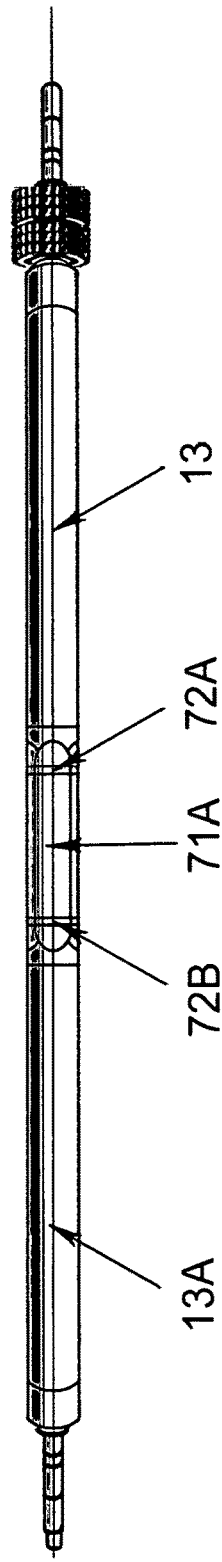

SEAMLESS HOIST

PRIORITY

Priority for this application is claimed from U.S. Provisional Application Ser. No. 62/922,899 filed on Sep. 5, 2019 entitled "Seamless Hoist".

BACKGROUND OF THE INVENTION

This invention relates generally to photography and more particularly to mechanisms used to create photographic backdrops.

Backdrops within the photographic industry are extremely important to create the proper compliment to the subject. Often the backdrop is a color that accents the subject's skin tone, eye color, hair, or clothing. Still other types of backdrops attempt to create an "outdoorsy" feel such as mountains, lakes, and a host of other scenes.

Those of ordinary skill in the art readily recognize a variety of backdrops, including, but not limited to: U.S. Pat. No. 7,236,695, entitled "Photographic Backdrop with Stand" issued to Demos on Jun. 26, 2007; U.S. Pat. No. 9,952,484, entitled "Photographic Background Assembly" issued to Bailey on Apr. 24, 2018; U.S. Pat. No. 7,835,571, entitled "Background Replacing Apparatus, Background Replacing Program, and Background Replacing Method" issued to Kaku on Nov. 16, 2010; and, U.S. Pat. No. 7,894,713, entitled "Backlit Photography Background System and Method" issued to Clark on Feb. 22, 2011; all of which are incorporated hereinto by reference.

Properly establishing the backdrops behind the subject is often difficult and time consuming, especially when the backdrops must be changed until the proper "feel" is obtained.

This invention provides an easy and versatile mechanism for the presentation of the backdrops.

SUMMARY OF THE INVENTION

The invention provides a hoist mechanism for a backdrop as used in the photographic setting. The hoist uses two vertical channels, each having an upper and a lower pull around which a belt is attached. A bracket, secured to the belt, is used to secure a roller of the backdrop thereto. A connecting rod, secured to the lower pullies of the vertical channels, is used to keep the two belts operating in concert. A hand crank, secured to the connecting rod, permits the operator to move the two brackets up/down which moves the roller having the backdrop in like fashion.

The hoist mechanism of this invention uses two vertical channels which contain an upper and a lower pulley connected by a belt mechanism. Secured to the belt is a bracket which is used to hold a roll of backdrop. The bottom pulleys (ideally sprockets with the belts being linkable members, such as chain or grooved belts, engaging with the sprockets) are connected to each other by a connecting rod with a hand crank. The operator rotates the hand crank to rotate the bottom pulleys in unison.

A variety of hand cranks are well known to those of ordinary skill in the art, including but not limited to those described in: U.S. Pat. No. 10,351,397, entitled "Chain Hoist" issued to Uebel on Jul. 16, 2019; and U.S. Pat. No. 9,655,800, entitled "Support Apparatus with Double Roller Assembly" issued to Ferderber on Mary 23, 2017; both of which are incorporated hereinto by reference.

As the bottom pulleys rotate, their associated belts also move to raise/lower the bracket holding the backdrop roll.

Ideally, the roller mechanism is removable from the bracket. In one embodiment of the invention, the roller's length is adjustable to meet the need of the backdrop. This is accomplished in the preferred embodiment where different segments of roller are joined together.

Those of ordinary skill in the art readily recognize a variety of pulleys and belts which may be used in this context, including, but not limited to those described in: U.S. Pat. No. 9,284,172, entitled "Manual Chain Block" issued to Ishikawa on Mar. 15, 2016; U.S. Pat. No. 10,337,243, entitled "Geared Bracket for Window Shade" issued to Berman et al. on Jul. 2, 2019; and, U.S. Pat. No. 10,723,595, entitled "Method for Operating at Least Two Lifting Means in a Group Operation and Assembly Comprising at Least Two Lifting Means" issued to Behnke on Jul. 28, 2020; all of which are incorporated hereinto by reference.

In one embodiment of the invention, the vertical channels are secured to a wall. In another embodiment, the vertical channels are secured to bases stands which are useful when the entire assembly is to be moved or transported to another location.

The bracket of this invention is ideally designed to allow the user to remove the bracket from the associated belt, but also allowing the brackets to be placed in "gangs" with each other. In this manner, two, three, four brackets are secured to the same belt allowing two, three or four different backdrops to be mounted in parallel. This permits the user to select the appropriate backdrop for the situation.

The brackets, ideally, utilize a slot which receives the roller but also uses a pin which accepts a hole in the ends of the roller.

Multiple blocks can be attached to each other to form a three (or more) stacked roller system. The blocks don't interfere with a pulley system for the rolls.

In the preferred embodiment, a 50 mm seamless cross bar with an integrated expander that is located in a centered position for better grip and to prevent the seamless roll from sagging in the middle. The cross bar is optionally doubled in length by adding a second identical cross bar.

End sections connect the rods and are used to firm up the rollers. The expanders expand when the knob is screwed towards the seamless. The use of expanders allows the pull rod that engages the expander to expand; counter holding knob; placement for hand driven round belt pully.

In the preferred embodiment, the tube of cross bar is 50 mm in diameter (about 2 inches) and the seamless cores is 54 mm. That leaves the cross bar enough room to slide freely in the core and makes it big enough to support the core evenly throughout the length.

The connector/end rod can be detached from the pole section to enable a second extender section to be attached. An allen wrench is ideally used to undo screw and detach rod.

Two sections can then be connected to form a single cross bar. The two sections couples together simply by pushing them into each other inside the seamless core. The expanders on both sections holds them in the joined position. The two section can be inserted into the seamless core from both sides. Additional extender sections are optionally added between two sections for the 140 inch seamless rolls.

The invention, together with various embodiments thereof, will be more fully explained by the accompanying drawings and the following description thereof.

DRAWINGS IN BRIEF

FIG. 2B graphically illustrates the preferred bracket mounted onto the vertical channels.

FIG. 3A illustrates three brackets secured to each other allowing three different backdrops to be available.

Figure 3B:
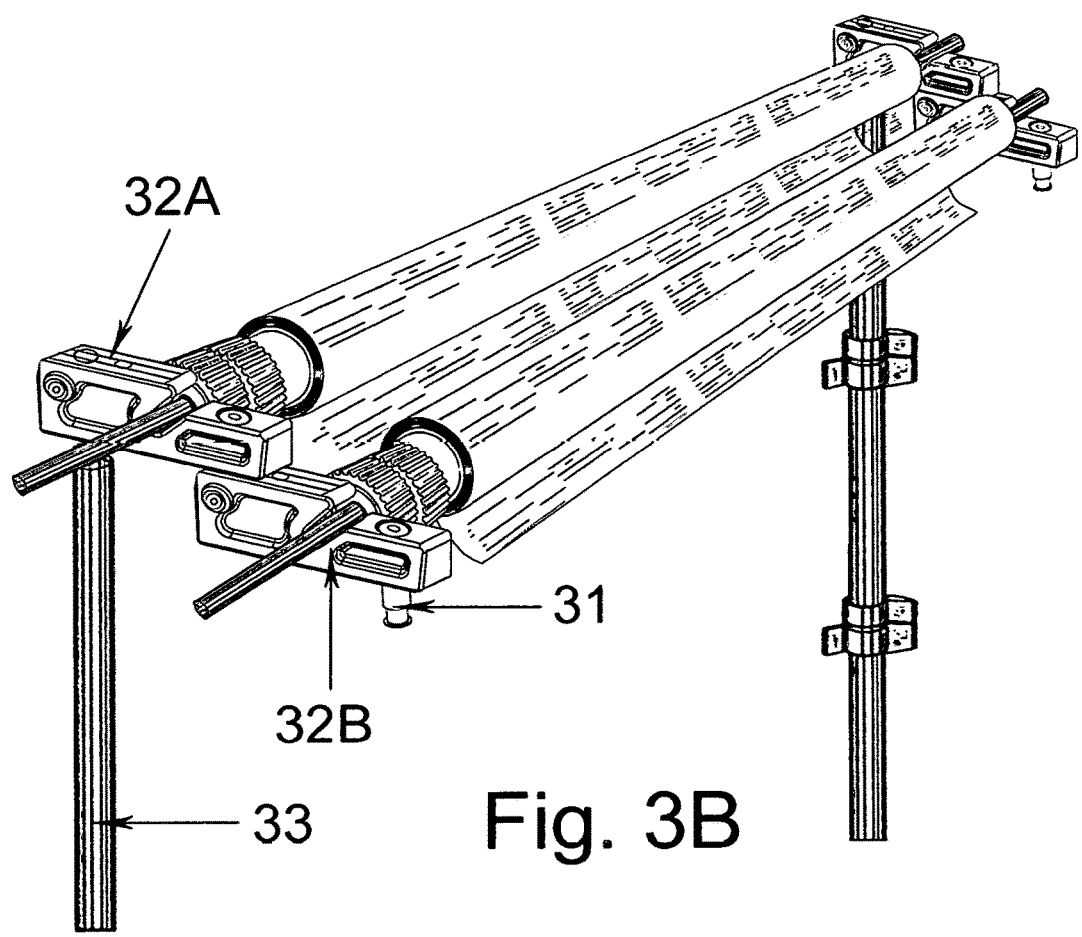

FIG. 3B illustrates a technique for connected blocks.

Figure 3C:
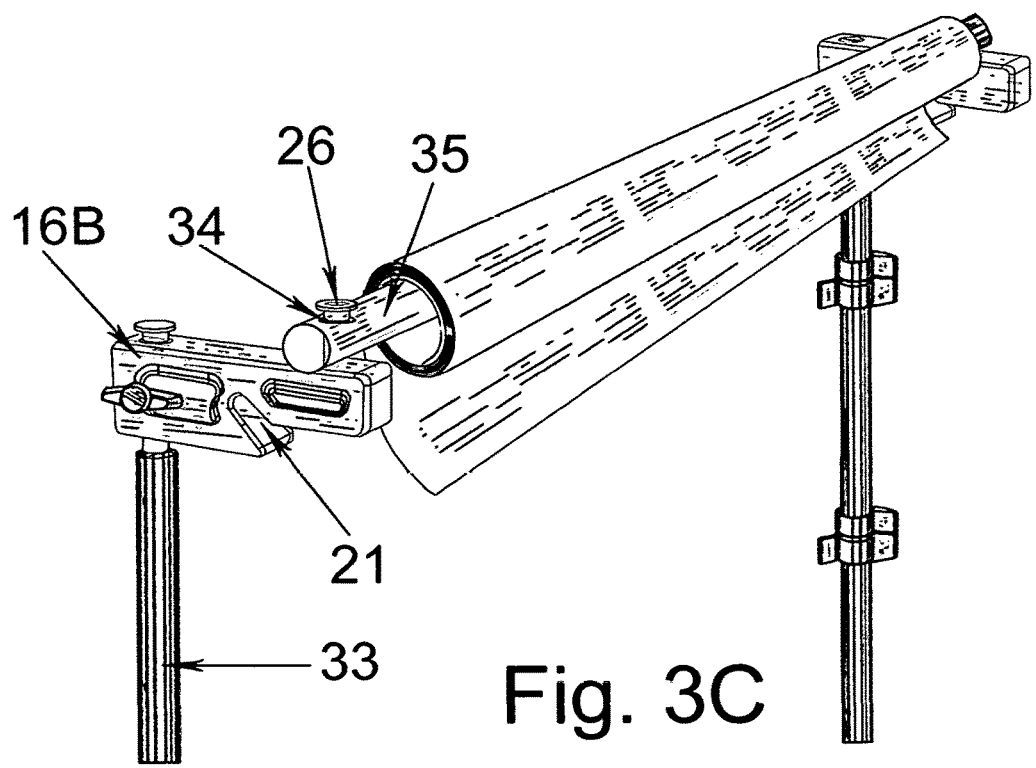

FIG. 3C illustrates the use of the block to engage a traditional roller.

FIG. 3D illustrates an alternative embodiment of the block which is designed to operate without an upright.

Figure 4A:
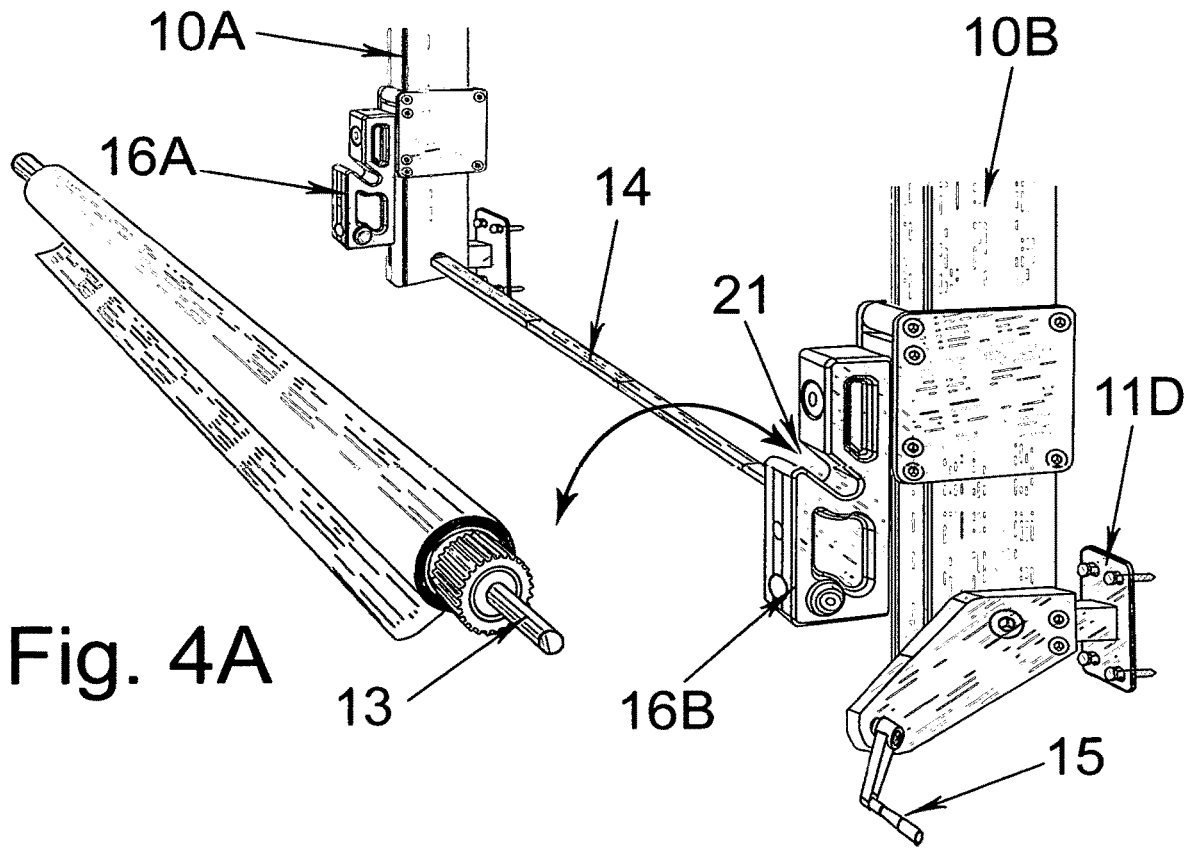
Figure 4B:
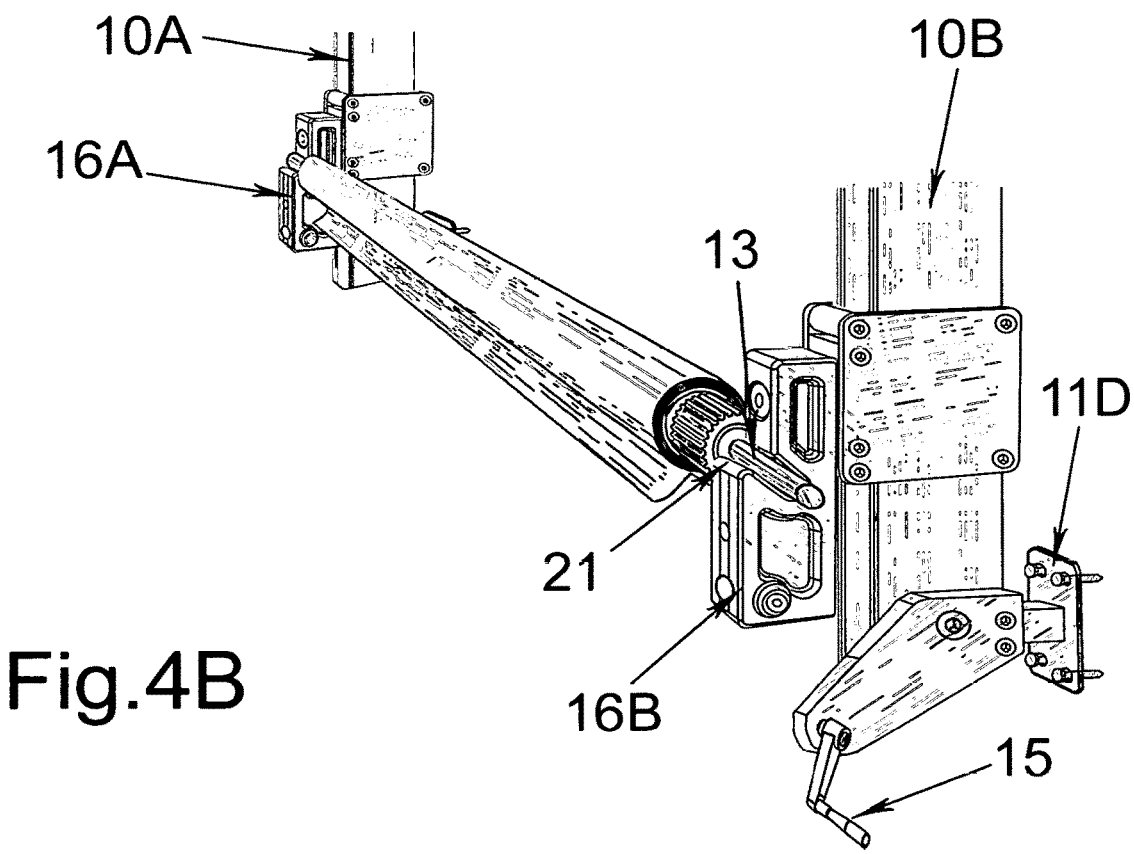

FIGS. 4A and 4B illustrate the placement of the roller into the bracket.

Figure 5:
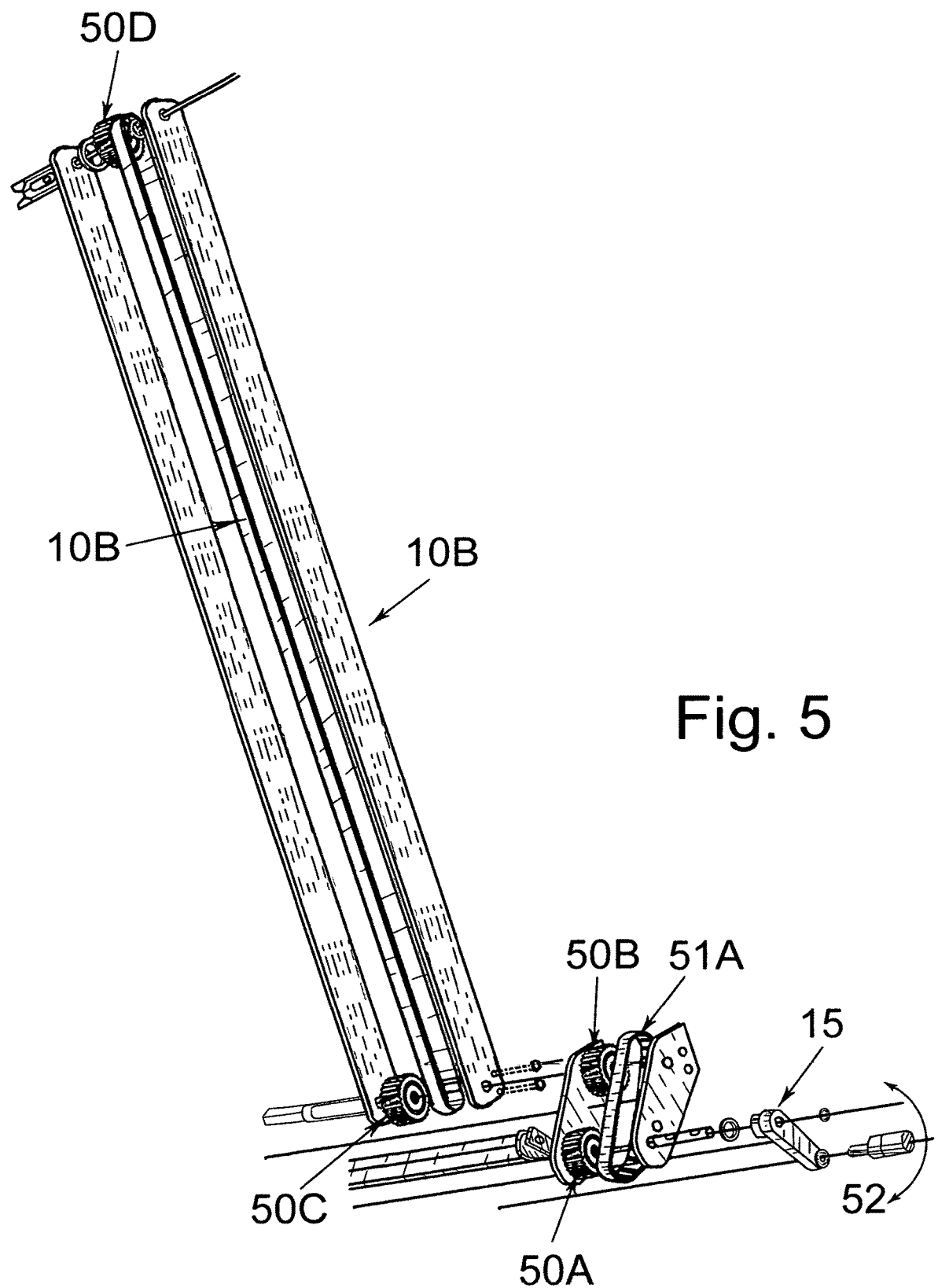

FIG. 5 illustrates the mechanical workings of the vertical columns.

FIG. 6 illustrates the deployment of the backdrop.

FIGS. 7A and 7B illustrate an embodiment of the invention in which two (or more) rollers are connected to each other to address greater backdrop widths.

DRAWINGS IN DETAIL

Figure 1:
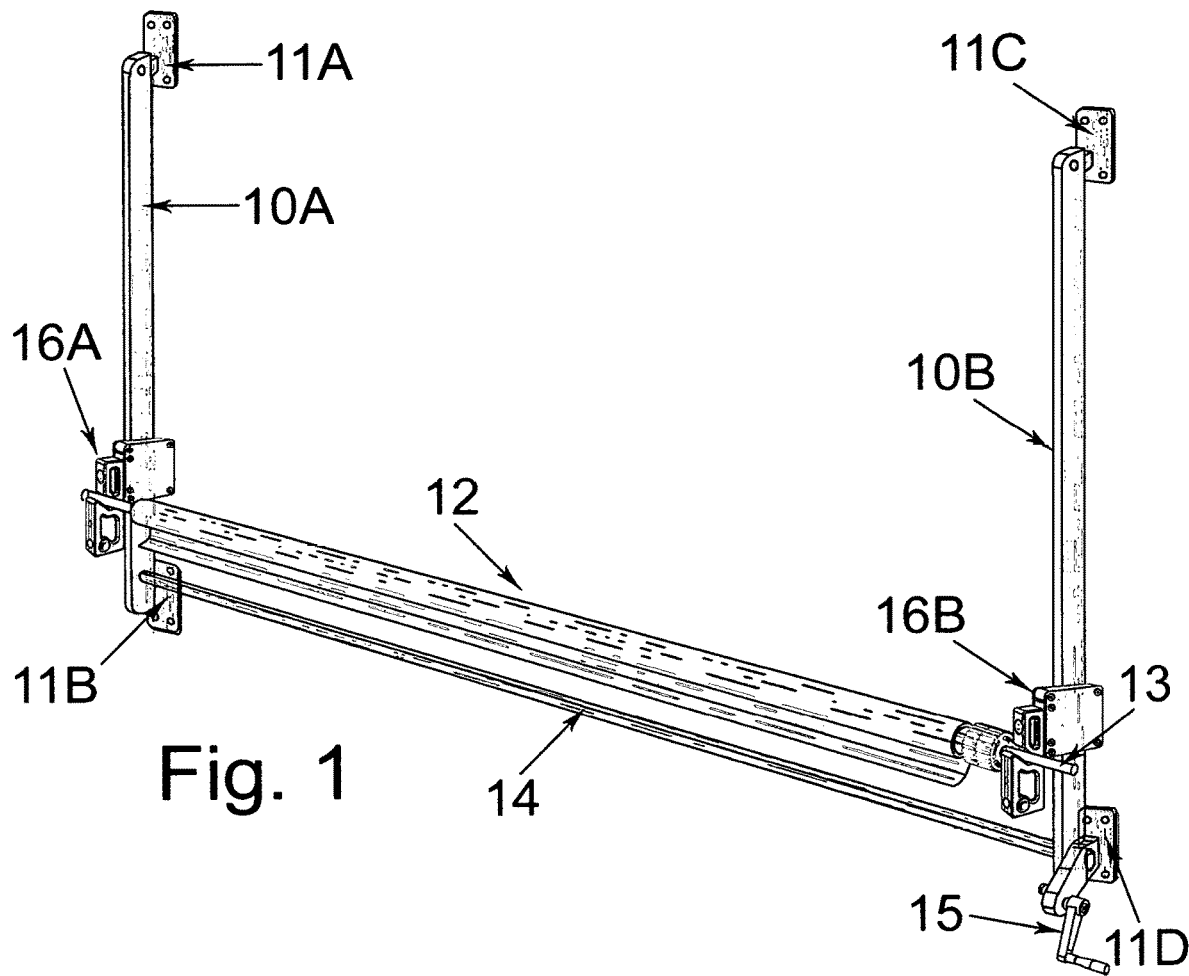
FIG. 1 is a perspective view of the preferred embodiment of the invention.

FIG. 1 is a perspective view of the preferred embodiment of the invention.

In this embodiment, the two vertical channels 10A and 10B are secured to the wall via wall brackets 11A, 11B, 11C, and 11D. Vertical channels 10A and 10B are spaced apart allowing backdrop paper 12 secured to roller mechanism 13, to be suspended therebetween.

Within vertical channels 10A and 10B are upper and lower pulleys (not shown in this illustration) which are interconnected by belts (also not shown). Connecting rod 14 is secured to both bottom pulleys and is responsive to movement by hand crank 15. As the operator rotates hand crank 15, the bottom pulleys rotate in unison causing the belts within vertical channels 10A and 10B to move. This movement, causes brackets 16A and 16B (connected to the belts) to raise/lower; thereby moving the roller mechanism 13 (and the backdrop paper 12) in a similar way.

The vertical channels 10A and 10B have a first upper pulley, a first belt mechanism (within 10A) a second upper pulley, a second lower pulley, a second belt mechanism (within column 10B).

While this embodiment mounts on the wall, an alternative embodiment uses movable stands or bases to support the vertical channels, allowing the mechanism to be moved or repositioned.

Figure 2A:
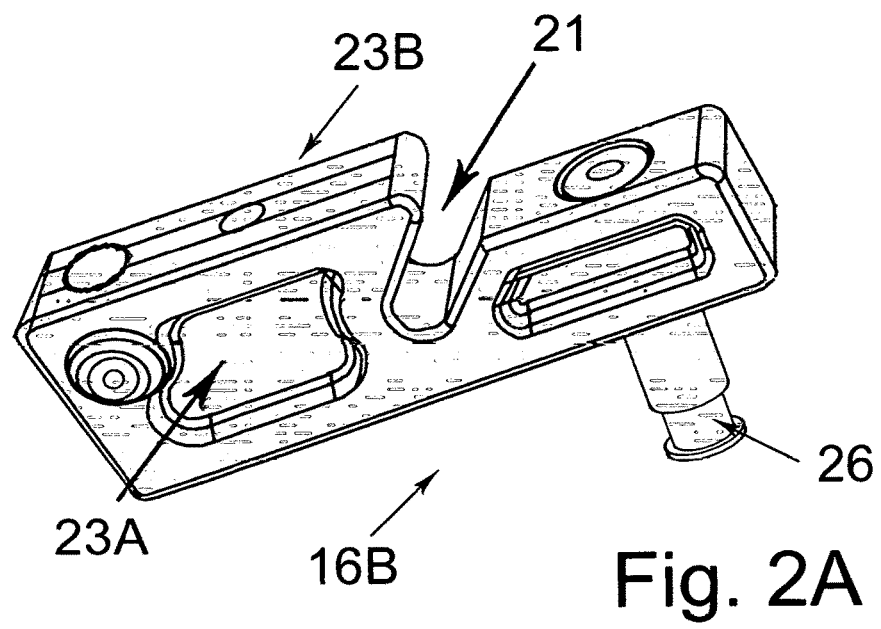
FIG. 2A illustrates the preferred bracket.

FIG. 2A illustrates the preferred bracket.

Bracket 16B has a receiver 23B which is configured to mate with either a connector on the vertical upright (not shown) or a connector 23A on another bracket. In this embodiment, pin member 26 is used to secure bracket 16B to the belt of the upright (neither shown in this illustration). Slot 21 is used to receive the bar from the roller (not shown).

FIG. 2B graphically illustrates the preferred bracket mounted unto the vertical channels.

Slide 22 moves along the vertical channel 10B as dictated by the belt (not shown) therein. Slide 22 contains a receiver 23A into which connector 24 is secured. This fastens bracket 16B to the belt within vertical channel 10B.

Bracket 16 includes a slot 21 which is configured to receive the end of roller 13 (of FIG. 1). The use of slot 21 on the brackets permits the user to easily place roller 13 into the two brackets without any undue coordination.

Receiver 23B is identical to receiver 23A allowing multiple brackets to be secured to each other permitting multiple rollers to be applied to a single pair of vertical channels.

In an alternative embodiment, pin 25 extends from the top of bracket 16B (and the other brackets). Pin 25 is adapted to received an end of the roller 13.

FIG. 3A illustrates three brackets secured to each other allowing three different backdrops to be available.

In this illustration, slide 22 is secured to the belt associated with vertical channel 10B as described before. Connected to slide 22 is bracket 16B and connected thereto is bracket 16C and then bracket 16D. These brackets, with their counterparts on the other vertical channel (not shown) support the backdrops 12A, 12B, and 12C respectively.

In this illustration, rollers 13A, 13B, and 13C, each have a pulley with pull string 30A, 30B, and 30C respectively. This allows the user to lower/raise by hand the backdrop for the specific situation.

FIG. 3B illustrates a technique for connected blocks.

Note, only one side of the mechanism is shown. The opposing second side is identically structured.

In this technique, blocks 32A and 32B are placed vertical to the vertical column 33. In this embodiment, the blocks are connected to the top of the vertical column which is raised/lowered using the hand crank (not shown) which raises/lowers the entire vertical column to obtain the desired height.

Block 32A engages the top of vertical upright 33 by a pin member which connects the vertical upright 33 with block 32A. Block 32A has a pin member similar to pin member 31 of block 32B, which engages a opening within block 32B. The pin member of block 32A is then secured via an allen screw (not shown).

Note, in this manner, using the pin members (such as 31), any number of blocks may be daisy chained to obtain the number of rollers being used and/or the set-off distance from the vertical upright.

This arrangement, as with the other attachment arrangement of FIG. 3A, allow blocks to be attached to each other to stack backdrop rolls. The multiple blocks are optionally attached to each other to form a three (or more) stacked roller system, and the blocks don't interfere with a pulley system which might be used for the dispensing of the backdrop rolls.

In order to adapt the rest of the hoist mechanism for the lengthened roller, the connector rod is easily doubled in length by adding a second identical connector rod. Even further, an additional extender section can be added between two sections for the 140 inch seamless rolls.

FIG. 3C illustrates the use of the block to engage a traditional roller.

In this configuration, block 16B is secured to vertical channel 33 inverse from that shown from FIG. 3B so that channel 21 is "downward" facing. This orientation places pin member 26 in an upperward orientation permitting pin member 26 to engage opening 34 of roller 35.

FIG. 3D illustrates an alternative embodiment of the block which is designed to operate without an upright.

In this embodiment, bracket 16B includes a mounting bracket 36 which is secured to the wall. The user places the roll of backdrop into the slot 21 and then dispenses the backdrop therefrom.

FIGS. 4A and 4B illustrate the placement of the roller into the bracket.

As noted earlier, vertical channel 10B is secured to the wall via wall bracket 11D. A hand crank is used to moved bracket 169 up/down along vertical channel 10B. Roller 13 is placed into slot 21 as illustrated by arrow 21 to be positioned as indicated in FIG. 4B.

In similar fashion, the opposing end of roller 13 is placed in the other bracket located on the opposing vertical channel 10A.

As hand crank 15 is rotated, as discussed earlier, connecting bar rotates causing the gears (not shown) within the vertical channels 10A and 10B to rotate and cause bracket 16B, move in unison upwards/downwards and thereby carry roller 13 up/down.

FIG. 5 illustrates the mechanical workings of the vertical columns illustrating a column first shown in FIG. 4.

Hand crank 15 is connected to pulley 50A (being a sprocket in this embodiment) which is connected to pulley 50B via belt 51A. As the hand crank 15 is rotated, as indicated by arrow 52, pulley 50A and 50B rotate. Pulley 50B is connected directly to pulley SOC. Via belt 519, pulley 50C communicates with pulley 50D. A bracket (not shown) is connected to belt 51B, thereby moving the bracket in the direction as desired by the user.

This arrangement creates a first upper pulley, a first belt mechanism (forming one of the columns from FIG. 4) a second upper pulley, a second lower pulley, a second belt mechanism (forming the second column of FIG. 4).

FIG. 6 illustrates the deployment of the backdrop.

Using hand crank 15, as discussed above, brackets 16A and 169 are moved to an upper section of vertical columns 10A an 10B. Roller 13 is held by brackets 16A and 16B. Backdrop 60A is then dispensed as indicated by 60B to provide the chosen backdrop for the photographic situation.

FIGS. 7A and 7B illustrate an embodiment of the invention in which two (or more) rollers are connected to each other to address greater backdrop widths.

In these illustrations, roller mechanism 13 and 13B are to be joined to form a combined roller mechanism being twice the length. The invention also contemplates the joining of any number of roller mechanisms.

Over the prongs 73 and 73A is placed a receptacle 70A and 70B which is secured to the associated roller mechanism 13 and 13A via allen screws (not shown) or other suitable mechanisms. Around prongs 73 and 73A are placed reinforcing members 71A, 71B, 71C, and 71D which engage with the receptacles 70A and 70B. Once engaged, the reinforcing members are affixed using rings 70A and 70B.

This then forms the combined roller mechanism 13 and 13B as illustrated in FIG. 7B.

Note, the use of the connecting mechanism of FIGS. 7A and 7B creates a 50 mm seamless cross bar with an integrated expander/connector that is located in a center position giving a better grip for the user and also prevents the seamless roll from sagging in the middle.

The invention, together with various embodiments thereof, will be more fully explained by the accompanying drawings and the following description thereof.

What is claimed is:

1. A hoist mechanism comprising:
   a) a first vertical channel having,
      1) a first upper pulley located proximate to a top of the first vertical channel,
      2) a first lower pulley located proximate to a bottom of the first vertical channel,
      3) a first belt mechanism engaging with the first upper pulley and the first lower pulley, and,
      4) a first bracket adapted to receive a roller, said first bracket secured to the first belt mechanism;
   b) a second vertical channel having,
      1) a second upper pulley located proximate to a top of the second vertical channel,
      2) a second lower pulley located proximate to a bottom of the second vertical channel,
      3) a second belt mechanism engaging with the second upper pulley and the second lower pulley, and,
      4) a second bracket adapted to receive a roller, said second bracket secured to the second belt mechanism;
   c) a connecting rod secured to the first lower pulley and the second lower pulley; and,
   d) a hand crank adapted to selectively rotate the connecting rod.

2. The hoist mechanism according to claim 1, further including a removable roller extending from the first bracket to the second bracket, said removable roller adapted to receive a roll of backdrop paper thereon.

3. The hoist mechanism according to claim 2, wherein the first belt mechanism and the second belt mechanism are composed of linked members.

4. The hoist mechanism according to claim 2, wherein the first upper pulley, the second upper pulley, the first lower pulley, and the second lower pulley are sprockets adapted to engage associated belt members.

5. The hoist mechanism according to claim 4, wherein the first vertical channel and the second vertical channel are secured to a wall.

6. The hoist mechanism according to claim 4, wherein the first bracket mechanism and the second bracket mechanism each have,
   a) a slot for receipt of the removable roller;
   b) a mechanism adapted to selectively engage an associated belt mechanism, and
   c) a receiver mechanism adapted to selectively engage another bracket mechanism.

7. The hoist mechanism according to claim 6, further including:
   a) a third bracket mechanism secured to first bracket mechanism; and,
   b) a fourth bracket mechanism secured to the second bracket mechanism.

8. The system according to claim 4, wherein the removable roller has a first section and a removable second section.

9. The system according to claim 4, wherein the first bracket mechanism and the second bracket mechanism each include a pin extending therefrom, said pin adapted to receive an end of the movable roller.

10. A hoist mechanism comprising:
    a) a first and a second vertical channel, each vertical channel having,
       1) an upper pulley located proximate to a top of the vertical channel,
       2) a lower pulley located below the upper pulley of the vertical channel,
       3) a belt mechanism engaging with the first upper pulley and the first lower pulley, and,
       4) a bracket adapted to receive a roller, said bracket secured to the belt mechanism;
    b) a connecting rod secured to the lower pulley of the first vertical channel and the lower pulley of the second vertical channel; and,
    c) a hand crank adapted to selectively rotate the connecting rod.

11. The hoist mechanism according to claim 10, further including a removable roller extending from the bracket of the first vertical channel to the bracket of the second vertical channel, said removable roller adapted to receive a roll of backdrop paper thereon.

12. The hoist mechanism according to claim 11,
  a) wherein the belt mechanism of the first channel and the belt mechanism of the second channel are composed of linkable members; and,
  b) wherein the upper pulley and the lower pulley of the first channel, and the upper pulley and the lower pulley of the second channel are sprockets adapted to engage an associated linked member.

13. The hoist mechanism according to claim 10, wherein the mechanism of the first channel and the bracket mechanism of the second channel each have:
  a) a slot for receipt of the removable roller;
  b) a clamping mechanism adapted to selectively engage an associated belt mechanism or alternatively another bracket mechanism; and
  c) a pin extending therefrom, said pin adapted to receive an end of the movable roller.

14. A hoist mechanism for a backdrop comprising:
  1) a first and a second vertical channel, each having,
    a) an upper pulley located proximate to a top of the vertical channel,
    b) a lower pulley located below the upper pulley,
    c) a first belt mechanism engaging with the upper pulley and the lower pulley, and,
    d) a bracket adapted to receive a roller, said bracket secured to the belt mechanism;
  2) a connecting rod secured to the lower pulley of the first vertical channel and the lower pulley of the second vertical channel;
  3) a hand crank adapted to selectively rotate the connecting rod; and,
  4) a first removable roller extending from the bracket of the first vertical channel to the bracket of the second vertical channel, said removable roller having a first dispensable backdrop thereon.

15. The hoist mechanism for a backdrop according to claim 14, further including:
  a) a third bracket mechanism secured to first bracket mechanism;
  b) a fourth bracket mechanism secured to the second bracket mechanism; and,
  c) a second removable roller extending from the third bracket to the fourth bracket, said removable second roller having a second dispensable backdrop thereon.

16. The hoist mechanism for a backdrop according to claim 15,
  a) wherein the belt mechanism of the first channel and the belt mechanism of the second channel are composed of linked members; and,
  b) wherein the upper pulley of the first channel, the upper pulley of the second channel, the lower pulley of the first channel, and the lower pulley of the second channel are sprockets adapted to engage an associated linked member.

17. The hoist mechanism hoist mechanism according to claim 15, wherein the bracket mechanism of each vertical channel, the third bracket mechanism, and the fourth bracket mechanism each have:
  a) a slot for receipt of the roller;
  b) a mechanism adapted to selectively engage an associated belt mechanism,
  c) a receiver mechanism adapted to selectively engage another bracket mechanism, and,
  d) a pin extending therefrom, said pin adapted to receive an end of a roller.

* * * * *